US007881085B2

(12) United States Patent
Sokuza et al.

(10) Patent No.: US 7,881,085 B2
(45) Date of Patent: Feb. 1, 2011

(54) INVERTER AND PROGRAMMING DEVICE THEREOF

(75) Inventors: Satoru Sokuza, Fukuoka (JP); Thomas B. Sasada, Gurnee, IL (US); William (Ty) C. Phillips, Skokie, IL (US); Michael J. Sergeant, Charlotte, NC (US); Paul Htin, Gurnee, IL (US)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 653 days.

(21) Appl. No.: 11/873,530

(22) Filed: Oct. 17, 2007

(65) Prior Publication Data

US 2008/0205092 A1   Aug. 28, 2008

Related U.S. Application Data

(63) Continuation-in-part of application No. PCT/JP2006/307740, filed on Apr. 12, 2006.

(30) Foreign Application Priority Data

Apr. 18, 2005 (JP) .............................. 2005-119659

(51) Int. Cl.
*H02M 7/537* (2006.01)
(52) U.S. Cl. ..................................... 363/131
(58) Field of Classification Search ................... 363/34, 363/36, 123, 125, 131
See application file for complete search history.

(56) References Cited

U.S. PATENT DOCUMENTS 5,381,548 A    1/1995  Matsuo

| 5,386,568 | A  |    | 1/1995  | Wold et al. |
|-----------|----|----|---------|-------------|
| 5,815,711 | A  |    | 9/1998  | Sakamoto et al. |
| 7,602,157 | B2 | *  | 10/2009 | Babcock et al. ............. 323/225 |
| 2004/0268300 | A1 |  | 12/2004 | Huin et al. |
| 2005/0034100 | A1 |  | 2/2005  | Liu |

FOREIGN PATENT DOCUMENTS

| GB | 2345593 A    | 7/2000 |
| JP | 2005-65364 A | 3/2005 |
| WO | 00/04629 A1  | 1/2000 |
| WO | 03/007150 A2 | 1/2003 |

OTHER PUBLICATIONS

CT SSPD; User Guide "UD70 Large Option Module and software for Unidrive"; Part No. 0447-0017, Issue No. 2; Nov. 1997; Control Techniques Drivers Ltd.
International Search Report of PCT/JP2006/307740; date of mail Jul. 18, 2006.
SSD Drives Inc; "ConfigEd Lite" Instruction Manual RG352747; Nov. 19, 2004; for use with ConfigEd Lite Ver. 6. X.

* cited by examiner

*Primary Examiner*—Adolf Berhane
(74) *Attorney, Agent, or Firm*—Westerman, Hattori, Daniels & Adrian, LLP (57) ABSTRACT

It is possible to easily and rapidly develop an inverter application while maintaining stable quality. Executable code modules which have been sufficiently tested are installed in an inverter. An application source code is created on a programming device by using function blocks corresponding to the executable code modules and connection lines for connecting the function blocks. The source code is complied to create a connection information table for selecting the executable code modules and specifying their execution order. The connection information table is downloaded to the inverter via communication to execute the application.

8 Claims, 6 Drawing Sheets

```
LD      AI1
ADD     AI2
ST      FREF
```

FIG. 8

```
FREF = AI1 + AI2;
```

INVERTER AND PROGRAMMING DEVICE THEREOF

RELATED APPLICATIONS

This application is a continuation-in-part of an International Patent Application No. PCT/JP2006/307740, filed on Apr. 12, 2006. This application claims priority under 35 U.S.C. §119 to Japanese Patent Application No. 2005-119659 filed on Apr. 18, 2005. Each of the entire disclosures of these applications is incorporated herein by reference in its entirety.

FIELD OF THE INVENTION

The present invention relates to an inverter capable of easily customizing an application portion with a high degree of quality.

DESCRIPTION OF RELATED ART

Figure 11:
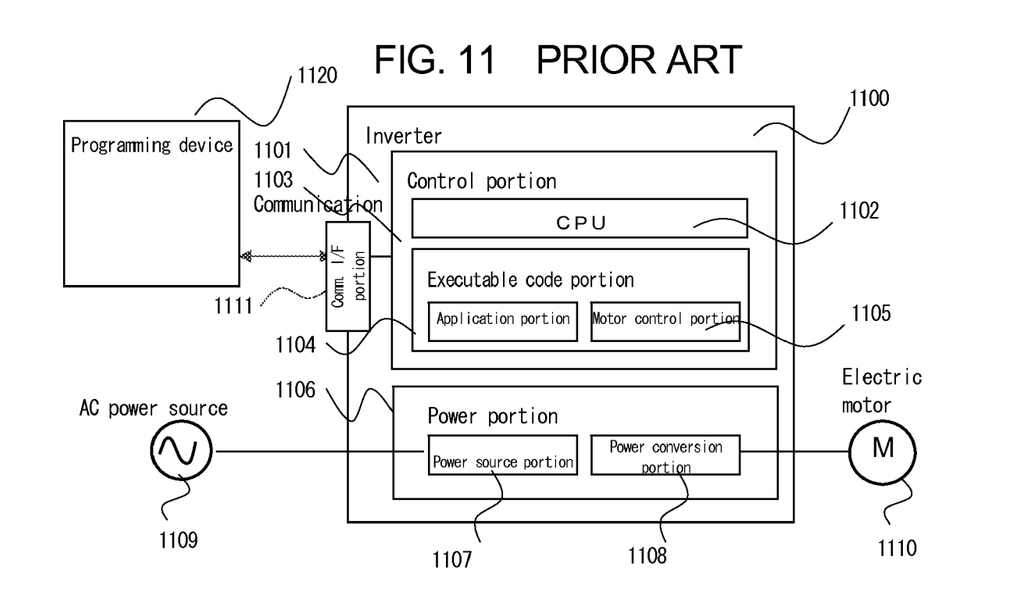
FIG. 11 shows a general structure of an inverter.

FIG. 11 shows a common structure of an inverter. The inverter 1100 is comprised of a power portion 1106 for inputting power from a commercially available AC power source 1109 and supplying the power to an electric motor 1110 to drive it, a control portion 1101 for controlling the power portion 1106, and a communication interface (I/F) portion 1111 for communicating with an outside device.

The power portion 1106 is comprised of a power source portion 1107 configured to input power from the commercially available AC power source 1109 and supply DC power to a power conversion portion 1108, and the power conversion portion 1108 configured to control the DC power supplied from the power portion 1107 and supply power for driving the electric motor 1110 in accordance with the specification of the operation.

The control portion 1101 is constituted by a CPU 1102 and an executable code portion 1103 which stores the executable code to be executed on the CPU 1102. The executable code portion 1103 is constituted of an application portion 1104 to be customized according to an application and a motor control portion 1105 independent of the application portion 1104.

The inverter is connected to a programming device 1120 for developing an application portion 1104 via the communication I/F portion 1111 as needed.

The application portion 1104 is developed by a programming device 1120 which is realized on a personal computer, etc., and converted into executable code. The executable code is downloaded to the inverter 1100.

The application portion 1104 is configured to realize an application for the inverter 1100 and has been conventionally developed by the following method.

Conventionally, in order to maintain stable quality, it was necessary to employ a method in which development proceeds step by step in accordance with development regulations; the source code is changed, debugged, and approved after the design review, and then prepared for sale. It was necessary to repeat the steps of changing of the source code, compiling it, downloading the executable code to the inverter 1100 and then debugging it until all the bugs were resolved. Therefore, there was a problem that it took too long to complete, resulting in difficulty in providing flexible support.

Several methods to cope with the aforementioned problem are as follows.

According to one of the methods, the programming device 1120 displays a number of function blocks, each corresponding to a specific source code module residing on the programming device 1120. Based on the connection of the function blocks, source code corresponding to an application is created. The source code is complied on the programming device 1120 to create executable code. Then, the executable code is downloaded to the inverter 1100 (see, e.g., Control Techniques Drives, Ltd. User Guide UD70 Large Option Module and software for Unidrive, Part Number: 0447-0017, Issue Number: 2)

Figure 12:
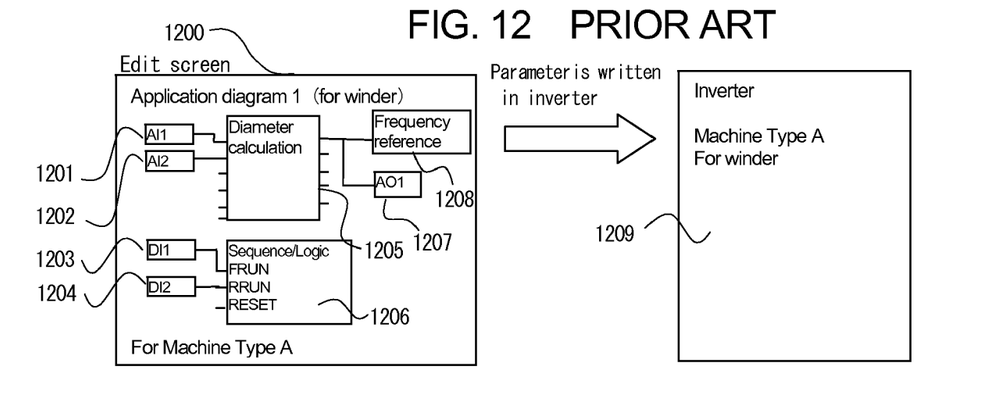
FIG. 12 is an application diagram 1.
Figure 13:
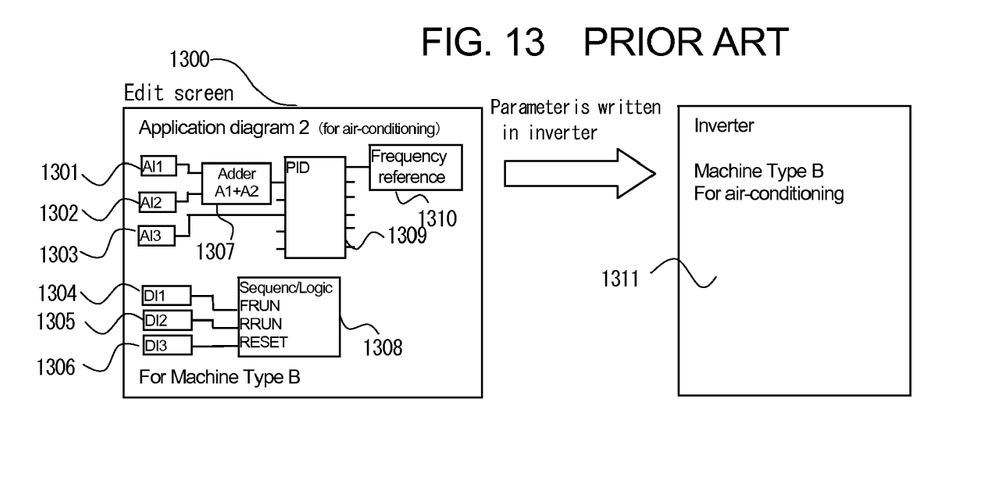
FIG. 13 is an application diagram 2.

According to another method, modularized source code for each machine type, application or function as shown in FIGS. 12 and 13 is preliminarily installed in the inverter 1100, in a manner that the source code modules are connectable based on connection information. Function blocks corresponding to the modularized source code installed in the inverter 1100 are prepared on the programming device 1120. By connection of the function blocks, source code for an application is created and the connection information is converted into a combination of connection parameters to set in the inverter 1100 ((see, e.g., SSD Drives, Inc. Instruction Manual RG352747 Issue 6.1).

The aforementioned "connection parameters" denote a parameter representing a function block connection, which is different from a parameter used by each function block for calculation.

According to the aforementioned first method, the source code for the function block is administrated on the programming device 1120. Therefore, there is a possibility of an erroneous revision, a calculation result overflow due to insufficient testing after the revision, or a memory overlap at the time of the download. Thus, there is a problem in that it lacks reliability.

Furthermore, since the entire executable code corresponding to an application is created, it takes time to compile the code and download it. Thus, there is a problem in that development is not efficient.

In this regard, according to the aforementioned second method, since the executable code for each function block is preliminarily installed in the inverter 1100, the aforementioned reliability problem is reduced substantially. Furthermore, objects to be downloaded are only function block connection information, etc. The function block executable code itself is not an object to be compiled or downloaded. Therefore, although the problem of requiring a finite time for compiling and downloading has been solved, there still exist the following problems.

All of the function blocks installed in the inverter 1100 are always in an operation state and therefore CPU time is used for irrelevant processing to the application, resulting in reduced effective processing time. Therefore, it is necessary to separately operate the application portion 1104 as dedicated software. There also exists a problem that the function block for each machine type or application is heavy in processing and lacks versatility.

In other words, it is possible to perform the function block connection and the parameter setting change on the application diagram prepared for each machine type. A function block diagram used for the other machine type cannot be used or a new function block cannot be created by combining function blocks. Furthermore, there also exists a problem that each function block includes much fixed processing and is therefore not very versatile.

For example, in application diagram 1 shown in FIG. 12, an application function block diagram for use in a winder is illustrated. However, this is a diagram prepared for the machine type A and therefore cannot be used for or applied to the machine type B shown in FIG. 13. In the same manner, the application diagram 2 shown in FIG. 13 cannot be used for the machine type A. As explained above, it is impossible to perform a major change, develop another machine type from a specific application once created or reuse the executable code. Furthermore, the prepared function blocks are always operating regardless of the connection status by the connecting line. Therefore, in the case of the multiple functions, the waste of processing time is larger.

As explained above, the conventional technique has such problems that the customizable range is limited, the flexibility of developing special applications is low, and the executable code process load in the CPU 1102 becomes heavy as the number of functions increases.

SUMMARY OF THE INVENTION

In the present invention, in order to cope with a wide variety of applications of an inverter 1100 and the programming device 1120 thereof, there are provided an inverter and a programming device of the inverter capable of changing an application portion 1104 in an executable code portion 1103 of a control portion 1101 from a standard and easily customizing while maintaining stable quality.

According to a first aspect of the present invention, in an inverter comprising: a power portion including a power source and a power conversion portion; a control portion including an executable code portion having an application portion and a motor control portion and a CPU for executing the executable code; and a communication interface portion for communicating with an outside device, connection information which selects an executable code module required for an application among a plurality of executable code modules preliminarily installed in the inverter and specifies an executable sequence thereof is downloaded to the inverter via the communication interface portion, and the executable code module is executed in accordance with the connection information.

According to this inverter, it is only necessary to download a connection information table 114 selecting the execution mode modules necessary for an application among executable code modules preliminarily installed in the inverter 1100 and specifying the execution sequence and not necessary to download an executable code module itself. Therefore, the development efficiency of an application can be improved substantially. Furthermore, since the executable code module has been preliminarily installed in the inverter 1100 only after completion of sufficient testing, the reliability can be improved substantially.

According to a second aspect of the present invention, in a programming device of an inverter comprising a power portion including a power source and a power conversion portion, a control portion including an executable code portion having an application portion and a motor control portion and a CPU for executing the executable code, and a communication interface portion for communicating with an outside device, the source code of an application is created from function blocks and connection lines connecting the function blocks to create connection information.

According to this programming device, the source code of an application can be easily created with function blocks corresponding to executable code modules and connection lines on a screen of the programming device 1120, and the connection information table 114 can be created based on it.

In the programming device described above, preferably, the connection information is downloaded to the inverter via the communication interface portion.

According to this programming device, the created connection information table 114 can be easily downloaded from the programming device 1120 to the inverter 1100.

In the programming device described above, preferably, the function block is a function block corresponding to the executable code module preliminarily installed in the inverter, or a function block newly created by combining the function block and the connection line.

According to this programming device, a new function block created by combining existing function blocks can be utilized to create an application.

In the programming device described above, preferably, the connection line has a numeric value or logic value.

According to this programming device, at the time of connecting function blocks with connection lines, incorrect connection of connection points different in type would not occur, which can improve the quality of the connection information table 114.

In the programming device described above, preferably, it is configured to display a connected or disconnected status to the inverter on a screen.

According to this programming device, since the connected or disconnected status of the programming device 1120 and the inverter 1100 is displayed on the screen of the programming device 1120, it is possible to easily understand whether the connection information can be downloaded to the inverter 1100.

In the programming device described above, preferably, it is configured to display the usage rate of the connection information on a screen.

According to this programming device, since the usage rate of the connection information is displayed on the screen of the programming device 1120, it is possible to easily grasp whether an application can be further added.

In the programming device described above, preferably, it is configured to display the processing time usage rate of the application portion on a screen.

According to this programming device, since the processing time usage rate of the application portion 1104 can be displayed on the screen of the programming device 1120, it is possible to easily grasp whether the CPU 1102 of the control portion 1101 still has processing capacity.

BRIEF DESCRIPTION OF THE DRAWINGS

The preferred embodiments of the present invention are shown by way of example, and not limitation, in the accompanying figures, in which.

DETAILED DESCRIPTION OF THE INVENTION

Hereafter, embodiments of the present invention will be explained with reference to the attached drawings.

Embodiment 1

Figure 1:
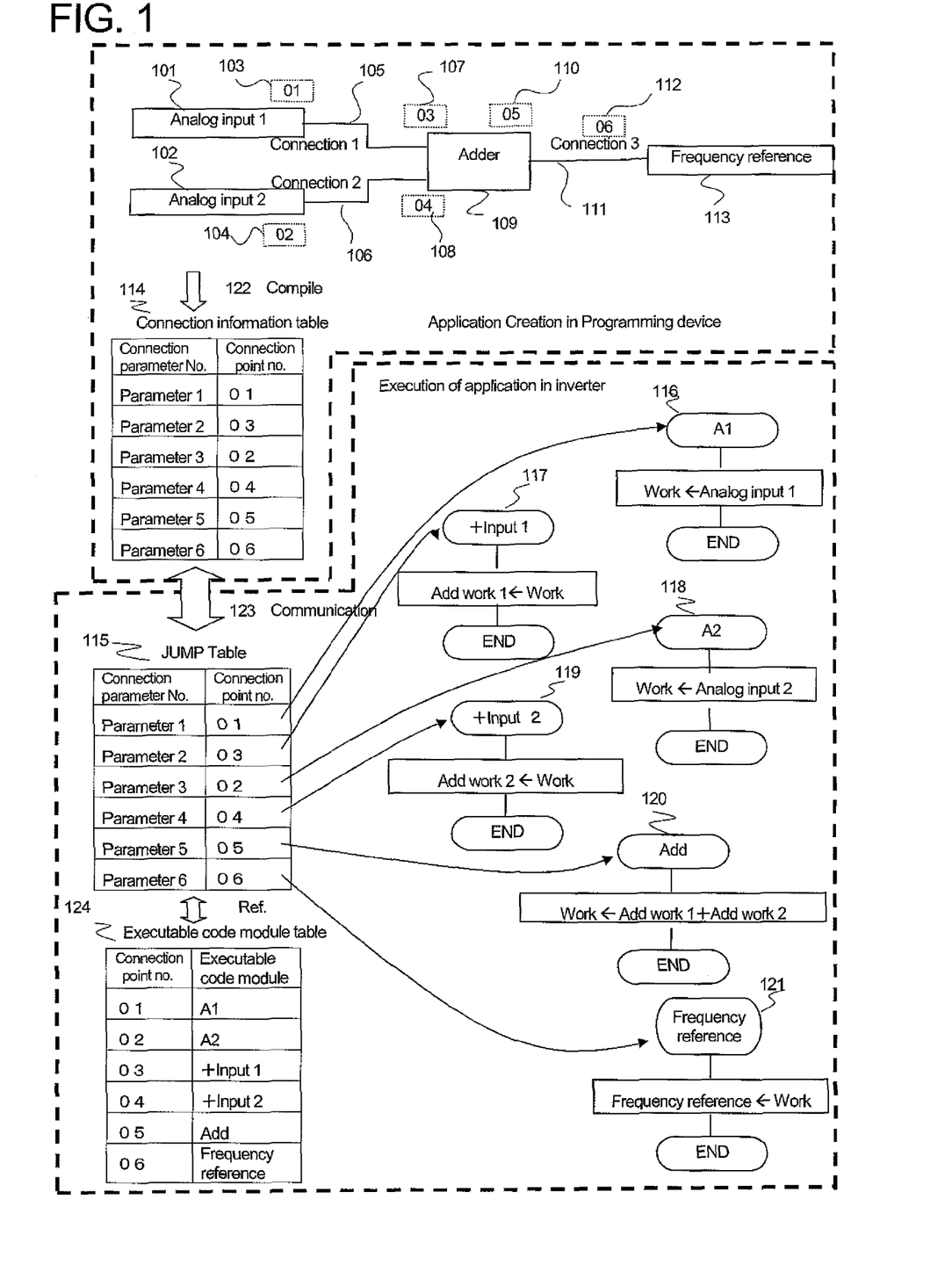
FIG. 1 shows a function block diagram and the processing flow according to the first embodiment of the present invention.

A first embodiment of the present invention is shown in FIG. 1. For the purpose of easy understanding, the following explanation will be directed to an example of an application in which an analog input 1 (101) and an analog input 2 (102) are added with an adder 109 to create a frequency reference 113.

As shown in the upper side of FIG. 1, the source code of an application is created using a programming device 1120. In detail, the function blocks of the analog input 1 (101), an analog input 2 (102), an adder 109 and the frequency reference 113 are displayed on a screen of the programming device 1120. By connecting them with connection lines, source code is created.

This source code is complied 122, and the executable code module to be executed and the information on the execution sequence will be created as the connection information table 114.

That is, the parameter number in the column of the connection parameter No. in this connection information table 114 shows the execution sequence. In the column of the connection point number, a unique connection point number owned by each function block is set as the value of the connection parameter.

In the inverter, since the connection point numbers and the executable code modules of the function blocks corresponding to the connection point numbers are correlated based on the executable code module table 124, the executable code module will be determined by the connection point number.

The executable code of each function block is preliminarily installed in the inverter and therefore not required to be downloaded again.

The connection information table 114 of this embodiment will be explained concretely.

To the connection parameter 1 of the input information of the connection line 1 (105), the output connection point number 01 (103) of the analog input 1 (101) is set. In the same way, to the connection parameter 2 of the output information of the connection line 1 (105), the input 1 connection point number 03 (107) of the adder 109 is set. Next, to the connection parameter 3 of the input information of the connection line 2 (106), the output connection point number 02 (104) of the analog input A2 (102) is set. In the same way, to the connection parameter 4 of the output information of the connection line 2 (106), the input terminal 2 connection point number 04 (108) of the adder 109 is set. Lastly, to the connection parameter 5 of the input information of the connection line 3 (111), the output connection point number 05 (110) of the adder 109 is set. In the same way, to the connection parameter 6 of the output information of the connection line 3 (111), the input connection point number 06 (112) of the frequency reference 113 is set.

These connection information is downloaded to the inverter 1100 via communication 123 such as RS-232C, and set to the JUMP table 115 existing in the application portion 1104. The executable code for executing the actual processing of the analog input 1 (101), the analog input 2 (102), the adder 109, and the frequency reference 113 is preliminarily installed in the application portion 1104 of the inverter 1100 in such a manner that it corresponds to the connection point numbers. Therefore, the executable code is not required to be newly downloaded.

The connection information table 114 and the JUMP table 115 are names in the programming device 1120 and that in the inverter 1100, respectively, which are different in name but the same in content.

Next, the execution of the application portion 1104 in the inverter 1100 will be explained.

The execution of the application portion 1104 in the inverter 1100 is executed based on the JUMP table 115. The execution is performed in the order of the connection parameter No. of the JUMP table 115 as shown in the lower side of FIG. 1.

That is, the executable code module corresponding to the connection point number set to the connection parameter No. of the JUMP table 115 is selected by searching the executable code module table 124 and then executed.

The processing corresponding to the connection point number of the JUMP table 115 will be explained from the top.

A1 (116): In this processing, the data of the analog input 1 function block 101 is stored in the data transfer work RAM.

+input 1 (117): The previously stored content of the work RAM is stored in the work RAM of the input 1 of the adder function block 109 connected to the analog input 1 function block 101.

A2 (118): In this processing, the data of the analog input 2 function block 102 is stored in the data transfer work RAM.

+input 2 (119): The previously stored content of the work RAM is stored in the work RAM of the input 2 of the adder function block 109 connected to the analog input 2 function block 102.

Add 120: In this processing, the added value of the content of the work RAM of the input 1 and input 2 of the adder function block 109 is stored in the data transfer work RAM.

Frequency reference 121: The previously stored contents of the work RAM is stored in the frequency reference block 113. The output of this frequency reference 113 is input to the motor control portion 1105 shown in FIG. 1.

As explained above, according to the present invention, it becomes possible to easily realize customization with a high degree of freedom while maintaining stable quality.

Embodiment 2

Next, a second embodiment will be explained. The explanation is directed to an example of the creation of a simple patterned operation application as shown in FIG. 2.

Figure 2:
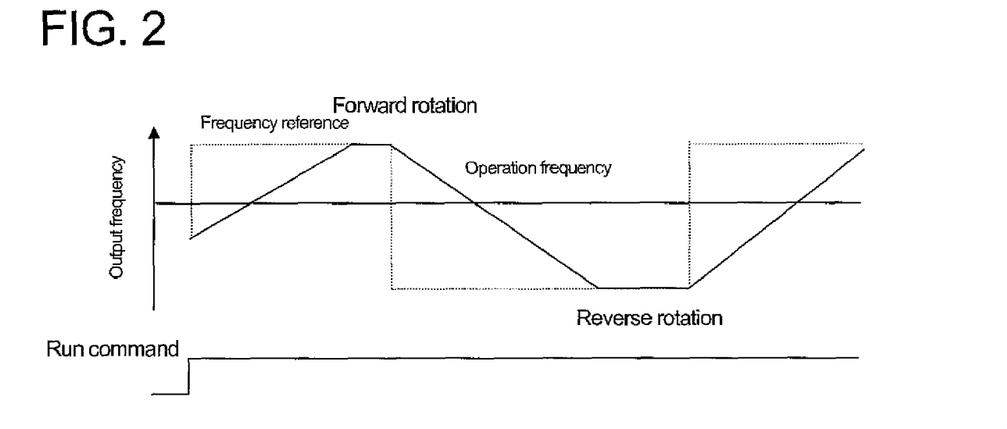
FIG. 2 is a timing chart according to the second embodiment of the present invention.

In order to perform a patterned operation along the operation frequency shown by the solid line in the time chart shown in FIG. 2, it is required to give a frequency reference shown by the broken line of FIG. 2 to the motor control portion 1105. In order to create such a frequency reference, a function block diagram, shown in FIG. 3 as the source code of the application, is created using the programming device 1120.

Figure 3:
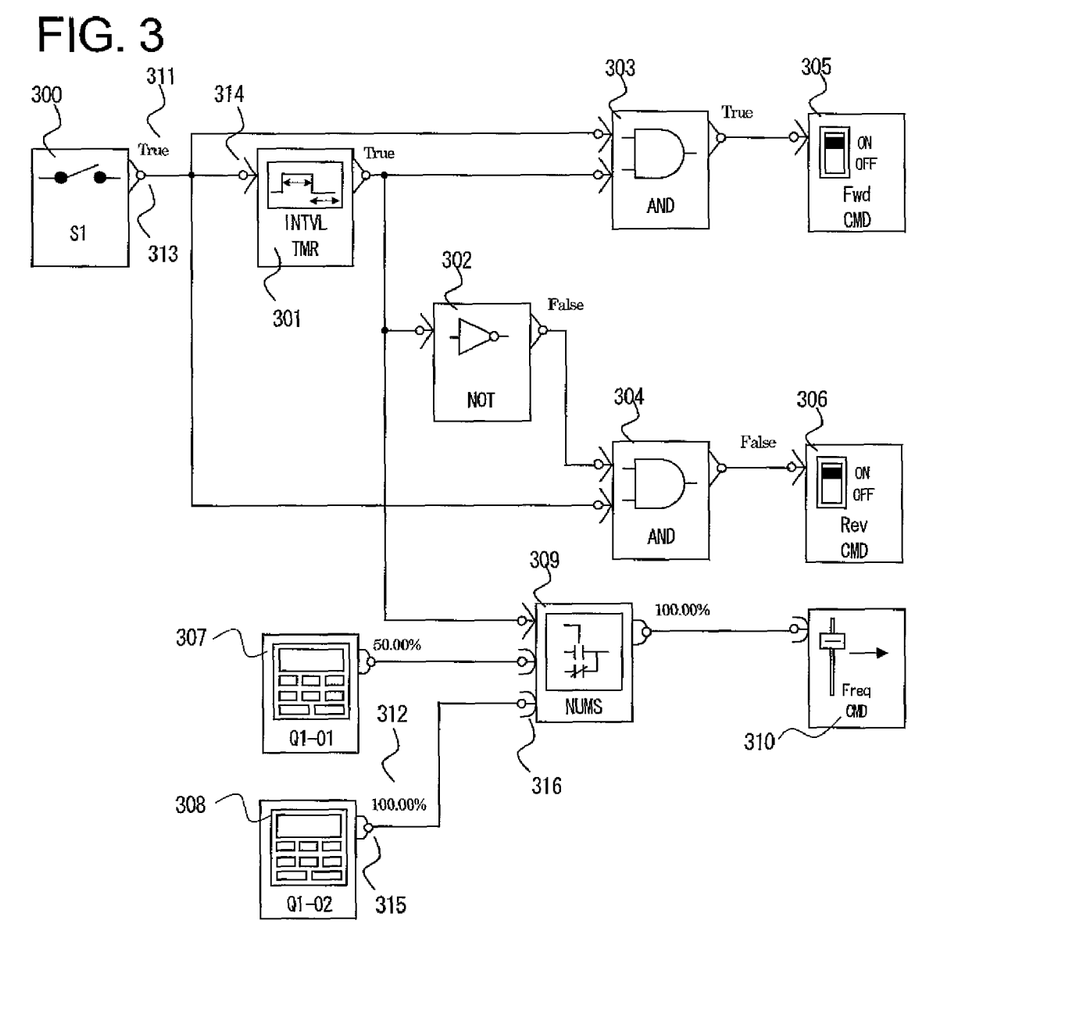
FIG. 3 is a function block diagram of the second embodiment of the present invention.

S1 (300) denotes a digital input terminal 1 function block of the inverter 1100, INTVL TMR 301 denotes a logic interval timer function block, NOT 302 denotes a logic NOT operation function block, AND 303, 304 denotes a logic AND operation function block, FwdCMD 305 denotes a forward run command function block for outputting a forward run command to the motor control portion 1105, RevCMD 306 denotes a reverse run command function block for outputting a reverse run command to the motor control portion 1105, Q1-01 (307) denotes a parameter input function block 1 for inputting a set value by a constant, Q1-02 (308) denotes a constant input function block 2 for inputting a set value by a parameter, NUMS 309 denotes a two input numeric value selection function block for selecting two numeric inputs, and FreqCMD 300 denotes a frequency reference function block for outputting a frequency reference to the motor control portion 1105.

Figure 4:
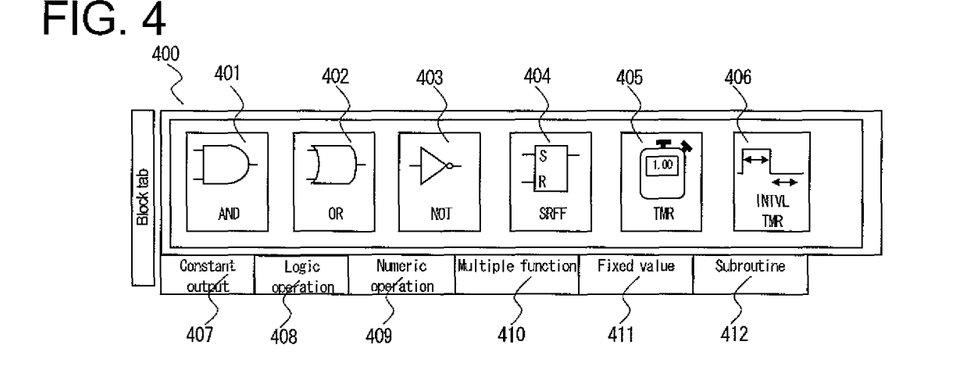
FIG. 4 is a tab display structure of the function block.

These function blocks are prepared, in the Tab 407-411 as shown in FIG. 4, as standard visually understandable function blocks which can be used for various machine types and applications. The executable code corresponding to each function block has been preliminarily installed in the application portion 1104 in the inverter 1100 after being fully tested.

At the time of creating source code on the programming device 1120, the function block can be placed at an arbitrary position on the screen program page by dragging it from the TAB and dropping it to the desired position.

After placing a function block on the screen, it can be connected to another function block by clicking the connection point portion. The connection point is configured such that a mark indicates whether it is a logic or a numeric value. Connection points which are different in type cannot be connected.

Figure 6:
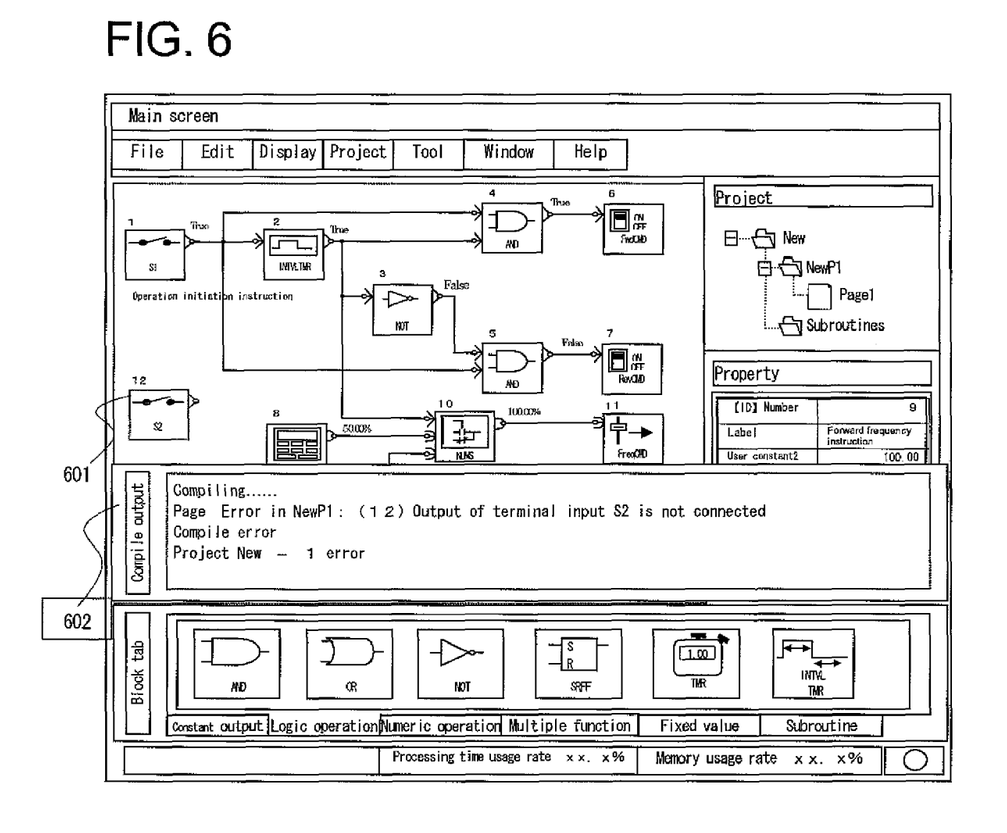
FIG. 6 is a compile error display in the second embodiment.

Functionally impossible connections will be displayed as an error at the time of compiling. For example, as shown in FIG. 6, when a digital input terminal 2 function block as a terminal input S2 (601) is added to an existing page and the compile is performed with the terminal input connected to none of the other function blocks, the error contents and the error number are displayed in the compile result output window 602, and then the compile is terminated. The compile result output window 602 is displayed on the screen at the time of the compile initiation.

Figure 5:
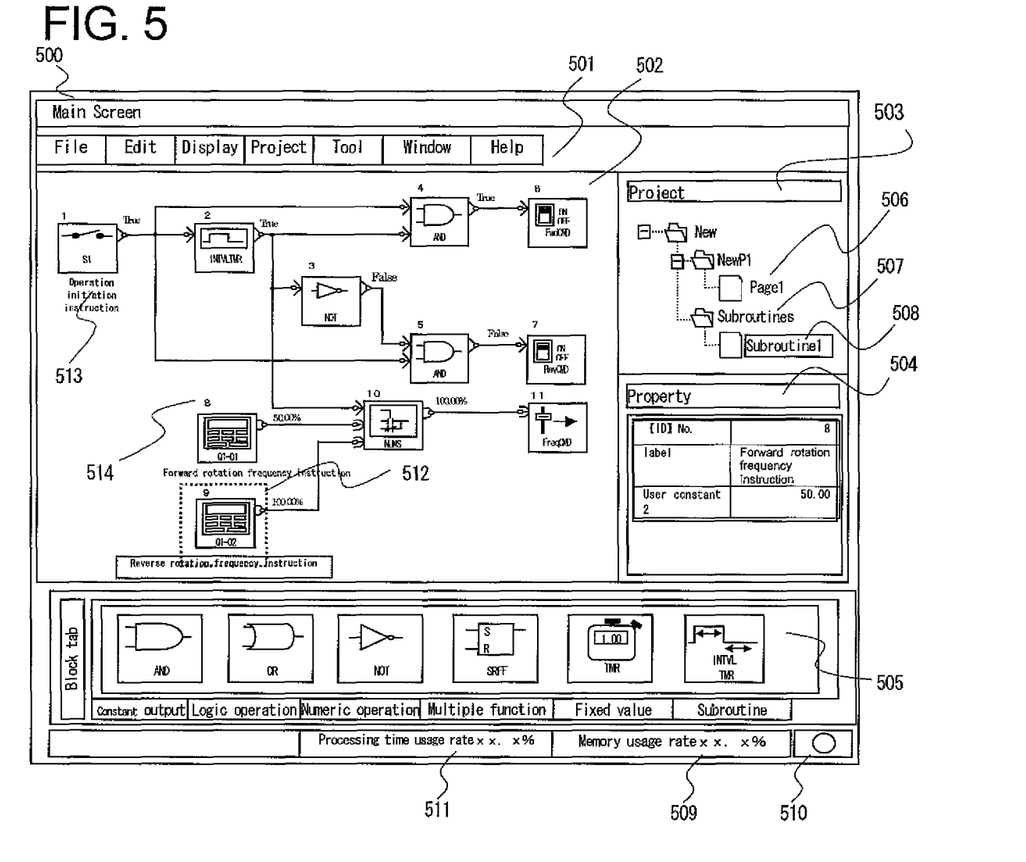
FIG. 5 is a display example of a programming device according to the second embodiment of the present invention.

The information (parameter, name, etc.) of each function block is displayed in the property window 504 of FIG. 5, and when the block is clicked the property information can be edited. In the example of FIG. 5, the information is displayed in the property 504 of the forward rotation frequency reference function block, wherein the ID number is set to "8," the label is set to "forward frequency reference," and the user parameter 2 is set to "50.0."

The source code of the application of this page can be stored as a project in the folder displayed in the project window 503 shown in FIG. 5.

In the same manner, a new subroutine can be created by creating a new page in the subroutine folder 507 of the project window 503 shown in FIG. 5. The function block diagram created here can be selected and used as one subroutine function block from the subroutine tab 412 of the function block tab window shown in FIG. 4.

As to the capacity limit of the program, there is an upper limit of the number of connections, specifically an upper limit of the number of lines of the connection information table 114. In order to notify the status of use, the usage rate of the current connection information is displayed in the memory usage rate display 509 on the lower portion of the screen shown in FIG. 5, with the upper limit as 100%. This display can be directly shown as the number of the currently used connection information, the % display or the number of available connections.

To show whether the programming device 1120 and the inverter 1100 can communicate, at the right lower portion of the screen of FIG. 5, for example, their connected/disconnected status 510 can be displayed in blue/red.

As to the processing time usage rate of the of the application portion 1104 with respect to the entire available processing time of the CPU 1102, a processing time usage rate monitor 511 is displayed at the central lower portion of the screen as shown in FIG. 5. In the case where the application portion is not connected (off-line) to the main body of the inverter 1100, the total of the expected processing time of the selected function blocks divided by the total available processing time by the CPU 1102 is displayed. In the case where the application portion is connected (on-line), the actual performance value of the inverter 1100 is read and displayed.

The output connection point of the S1 function block 300 shown in FIG. 3 is displayed as the logic output connection point 313. This is connectable to the logic input terminal 314 as an input of the interval timer 301, but not connectable to the numeric value input terminal.

In the same manner, the output of Q1-02 (308) is a numeric value output connection point 315 and connectable to the input connection point 316 of the 2 numeric value input selector 309 as a numeric input connection point, but not connectable to the logic input connection point.

Next the operation of the embodiment shown in FIG. 3 will be explained.

S1 (300) is an input terminal 1 of the inverter 1100 and a start command for patterned operation. When the input terminal is closed, the output of S1 (300) becomes True "1," which sets the run command as shown in FIG. 2.

This output signal is input into AND 303, 304 and INTVL TMR 301. Upon the input, the INTVL TMR 301 is brought into operation and repeats ON/OFF accordingly. This output signal is input into the AND circuit 303, 304 together with the output signal of S1 (300), and each of the AND circuit 303, 304 is input into the forward run command 305 and the reverse run command 306. The ON time parameter and the OFF time parameter can be set and referred to at the property 504 located at the right side of the screen shown in FIG. 5.

Furthermore, the output from the INTVL TMR 301 and the constants 307, 308 are each input into the NUMS 309 as forward/reverse run command, and the output of the NUMS 309 is changed as the forward frequency reference 307/reverse frequency reference 308 by the ON/OFF of the output of the INTVL TMR 301 and input into the frequency reference 310 as a final frequency reference.

The outputs of the forward run command 305, reverse run command 306 and frequency reference 310 are input into the motor control portion 1105 of FIG. 11 to thereby realize the operation as shown by the operation frequency of FIG. 2.

As mentioned above, the source code of the application is converted into the connection information on the programming device 1120 and downloaded to the inverter 1100 via the communication interface 1111. As mentioned in Embodiment 1, in the inverter 1100, only the executable code corresponding to the function blocks selected by the connection information will be executed, and the application shown by the function block diagram on the screen of the programming device 1120 is executed. As explained above, the executable code of the application portion is executed only when selected, and therefore the wasted processing time of CPU 1102 can be reduced.

Figure 7:
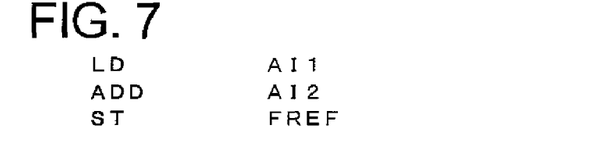
FIG. 7 is an instruction list (IL)
Figure 8:
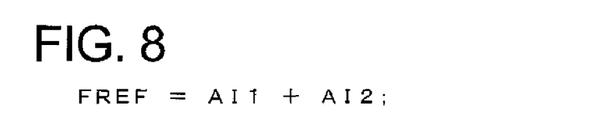
FIG. 8 is a structured text (ST)
Figure 9:
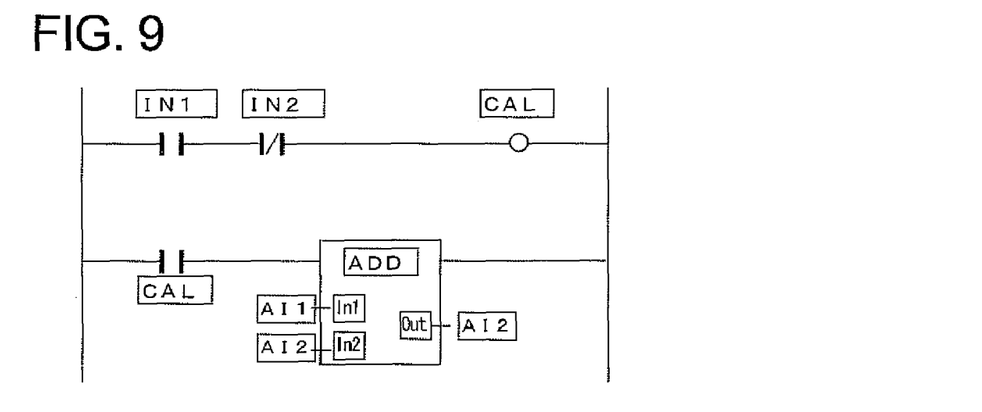
FIG. 9 is a ladder diagram (LD)
Figure 10:
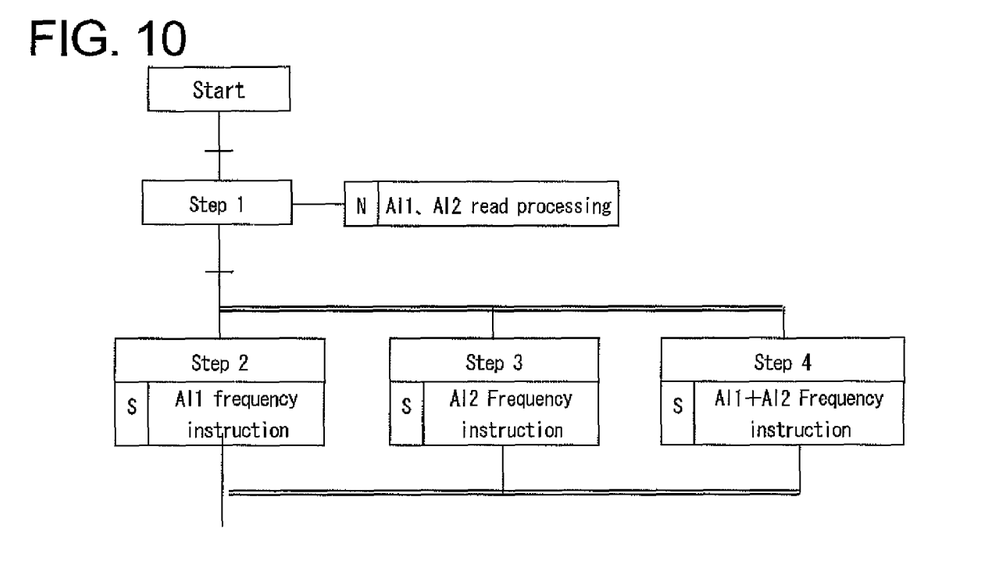
FIG. 10 is a sequential function chart (SFC)

In creating the source code of an application, not only the aforementioned function block diagram (FBD: function block diagram) but also the IL: instruction list as shown in FIG. 7, the SL: structured text as shown in FIG. 8, the LD: ladder diagram as shown in FIG. 9, and the SFC: sequential function chart as shown in FIG. 10, etc., can be used.

In the case of FIG. 7, the IL is created with a text editor and processed with a compiler for converting the IL into connection information to create a connection information table 114 as shown in FIG. 1.

In the case of FIG. 8, the ST is created with a text editor and processed with a compiler for converting the ST into connection information to create a connection information table 114 as shown in FIG. 1.

In the case of FIG. 9, the LD is created with a ladder editor and processed with a compiler for converting the LD into connection information to create a connection information table 114 as shown in FIG. 1.

In the case of FIG. 10, the SFC is created with a SFC editor and processed with a compiler for converting the SFC into connection information to create a connection information table 114 as shown in FIG. 1.

After creation, the connection information table 114 is downloaded to the inverter and executed in the same manner as in the case of FBD.

As explained above, according to the present invention, it becomes possible to realize easy development of high quality application which was conventionally not possible.

The present invention provides an inverter and programming device capable of easily being applied to various types of inverter industrial applications while maintaining high quality.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

The invention claimed is:

1. An inverter, comprising:
a power portion including a power source and a power conversion portion;
a control portion including an executable code portion having an application portion and an independent motor control portion and a CPU for executing the executable code; and
a communication interface portion for communicating with an outside device,
wherein the application portion comprises: a JUMP table for storing a connection information constituted by a series of connection parameter numbers indicating an execution order and a series of unique connection point numbers of function blocks, and an executable code module table by which the connection point number and an executable code module of the function block are corresponded to each other, the executable code module table being permanently programmed in the application portion,
wherein the inverter is arranged to receive the connection information downloaded to the inverter by way of the communication interface portion, and
wherein the CPU is arranged to select an executable code module corresponding to a connection parameter number from the executable code module table and to execute the selected executable code in an order of the connection parameter number of the JUMP table.

2. The inverter as recited in claim 1, further comprising a programming device,
wherein the connection information is generated by using the programming device to form a source code of an application, by arranging the function block and a connection line for connecting the function block to another function block.

3. The inverter as recited in claim 2, wherein the connection information is downloaded to the inverter via the communication interface portion.

4. The inverter as recited in claim 2, wherein the function block is a function block corresponding to the executable code module preliminarily installed in the inverter, or a function block newly created by combining the function block and the connection line.

5. The inverter as recited in claim 2, wherein the programming device is configured to display a connected or disconnected status to the inverter on a screen.

6. The inverter as recited in claim 2, wherein the programming device is configured to display a usage rate of the connection information on a screen,
wherein the usage rate of the connection information is a rate of the number of current connection information with respect to an upper limit of the number of the connection information.

7. The inverter as recited in claim 2, wherein the programming device is configured to display a processing time usage rate of the application portion with respect to an entire available processing time of the CPU on a screen.

8. An inverter, comprising:
a power portion including a power source and a power conversion portion;
a control portion including an executable code portion having an application portion and a motor control portion and a CPU for executing the executable code;
a communication interface portion for communicating with an outside programming device; and
a number of executable code modules preliminarily installed in the inverter,
wherein the inverter downloads a connection information via the communication interface portion, and creates an application by executing an executable code module in accordance with the connection information,
wherein the connection information includes a selection information selecting the executable code module required for the application among the number of executable code modules preliminarily installed in the inverter, and an execution sequence information specifying an execution sequence of the executable code module, wherein the connection information is formed by generating and compiling a source code of the application by means of the outside programming device when connecting function blocks with each other in the outside programming device, the function blocks corresponding to the executable code module, respectively.

* * * * *